Patented July 2, 1929.

1,719,066

UNITED STATES PATENT OFFICE.

CASIMIR MASSE, OF PARIS, FRANCE, ASSIGNOR TO SOCIÉTÉ CIVILE DES PROCÉDÉS MASSE, OF PARIS, FRANCE.

TREATMENT OF PLANT FIBERS.

No Drawing. Application filed February 10, 1927, Serial No. 167,379, and in France February 22, 1926.

This invention relates to a special process of treating the green or dry strips of the grass-cloth plant called "ramie", although the process may be extended to other vegetable fibers, with a view to obtaining a product suitable for the trade. The process consists in submitting the fibers to the action of a bath of rice starch or starch of any other amylaceous plant or potato fecula. An embodiment of the process consists in boiling the strips or thongs of ramie in any alkaline lye contained in an autoclave, passing them into a bath of soap, then into a bath of starch, drying by centrifugation being effected between each operation.

The treatment is applied to the green or dry strips of ramie previously freed from ords that is, the tender inner portion of the stalk. The strips are first well washed to remove the dirt.

They are then placed into a tank, preferably an autoclave which gives better results and permits of easy regulation of the temperature during the time necessary for cooking. The autoclave contains an alkaline lye of 5° Baumé and heated to 115° centigrade. The duration of cooking is about 30 minutes and varies according to the nature of the strips.

The strips are then withdrawn from the autoclave, dried by centrifugation to remove the remainder of pellicles and passed into soap water.

After another drying by centrifugation, the fibers are passed several times into a milky bath of starch, the function of the starch is physical. The starch acts to expand the strips or cause them to swell. This results in a liberation of the fibers from the outer skin.

The strips are again dried by centrifugation in a centrifugator surrounded with felt or other similar material, slightly heated to urge the drying of the fibers covered with starch, then beaten slightly to cause the excess of starch to fall off. This beating causes the skin portions not already removed in prior operations, to fall away from the fibers. Beating not only removes the starch but also separates the fiber from the skin.

By this process fibers are obtained having properties comparable with cotton, which can be bleached and even mercerized. Said fibers are applicable in particular to the making of sail cloths, fishing nets, ropes and cloths.

What I claim is:—

1. The process of treating vegetable fibers which comprises subjecting the fibers to the action of a starch solution to loosen the fibers from the outer skin covering, drying the so treated fibers and thereafter beating the fibers to remove excess starch and separate the fibers from the skin.

2. The process of treating vegetable fibers which comprises subjecting the fibers to the action of a solution of alkali, removing the adhering solution from the fibers, subjecting the fibers to a solution of soap, removing the adhering soap solution, immersing the so treated fibers in a starch solution, subsequently drying the fibers and thereafter beating the fibers.

3. The process as in claim 1 in which ramie is used.

4. The process as in claim 2 in which ramie is used.

In testimony whereof I affix my signature.

CASIMIR MASSE.